(12) United States Patent
Goman et al.

(10) Patent No.: US 7,007,448 B2
(45) Date of Patent: Mar. 7, 2006

(54) REEL MOWER WITH TUNED MASS DAMPER

(75) Inventors: Gerald E. Goman, Spring Valley, WI (US); Ronald L. Eichten, Shakopee, MN (US); Michael J. Gilberg, Mendota Heights, MN (US); Donald A. Keeney, Bloomington, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 10/103,654

(22) Filed: Mar. 20, 2002

(65) Prior Publication Data

US 2003/0177746 A1 Sep. 25, 2003

(51) Int. Cl.
*A01D 34/42* (2006.01)

(52) U.S. Cl. .......................................................... 56/249
(58) Field of Classification Search ................ 56/6, 56/7, 126, 249, 294, DIG. 10, DIG. 2
See application file for complete search history.

(56) References Cited

U.S. PATENT DOCUMENTS

| | | | | |
|---|---|---|---|---|
| 2,532,230 A | * | 11/1950 | Hupp .......................... 56/15.7 |
| 2,972,218 A | * | 2/1961 | Benson ........................ 56/15.3 |
| 3,456,430 A | * | 7/1969 | Maloney ...................... 56/12.8 |
| 3,576,097 A | * | 4/1971 | Speiser .......................... 56/249 |
| 3,641,748 A | * | 2/1972 | Vose ............................ 56/15.7 |
| 3,824,772 A | * | 7/1974 | Sorenson et al. ................. 56/7 |
| 4,345,419 A | * | 8/1982 | Chandler ...................... 56/249 |
| 4,481,757 A | * | 11/1984 | Tsuchiya ..................... 56/16.9 |
| 4,807,840 A | | 2/1989 | Baker et al. |
| 4,878,340 A | * | 11/1989 | Roy et al. ..................... 56/249 |
| 5,394,039 A | * | 2/1995 | Suchdev et al. ............... 310/51 |
| 5,442,883 A | | 8/1995 | Nishimura et al. |
| 5,623,817 A | * | 4/1997 | Bricko et al. ..................... 56/7 |
| 5,647,726 A | | 7/1997 | Sehgal et al. |
| 5,704,259 A | | 1/1998 | Riehle |
| 5,884,892 A | * | 3/1999 | Gassen et al. .............. 248/635 |
| 5,950,409 A | * | 9/1999 | Davies ........................ 56/249 |
| 6,044,631 A | * | 4/2000 | Anderson et al. ................. 56/7 |
| 6,101,796 A | * | 8/2000 | Wattron et al. .............. 56/13.6 |
| 6,203,454 B1 | | 3/2001 | Nashif et al. |
| 6,292,967 B1 | | 9/2001 | Tabatabai et al. |
| 6,315,094 B1 | | 11/2001 | Griffin et al. |
| 6,318,059 B1 | * | 11/2001 | Cotton ........................ 56/251 |
| 6,412,258 B1 | * | 7/2002 | Doerflinger ..................... 56/7 |

\* cited by examiner

*Primary Examiner*—Robert E. Pezzuto
*Assistant Examiner*—Nathan Mammen
(74) *Attorney, Agent, or Firm*—James W. Miller

(57) ABSTRACT

A mass damper is carried on the frame of an reel mower by a pair of elastomeric couplers, one at each end of the mass damper. Each coupler is threadedly secured to one end of the mass damper with the coupler received in a cavity at that end of the mass damper. Each coupler is also clamped to a bracket on the frame of the reel mower. The mass damper can move relative to the frame of the reel mower by shearing the elastomeric material forming the couplers. The weight of the mass damper and the stiffness of the couplers is chosen to damp or lessen the vibration induced in the frame of the reel mower by an internal combustion engine carried on the frame of the reel mower.

17 Claims, 4 Drawing Sheets

REEL MOWER WITH TUNED MASS DAMPER

TECHNICAL FIELD

This invention relates to a reel mower, such as a walk greensmower, that has a vibrational excitation source, such as an internal combustion engine. More particularly, this invention relates to a mass damper movably secured to the frame of the reel mower for damping vibration caused by the vibrational excitation source.

BACKGROUND OF THE INVENTION

Reel mowers are well known for cutting grass, often at close heights of cut. Many such reel mowers have a handle assembly that extends upwardly and rearwardly from the frame of the reel mower. This allows an operator who walks behind the reel mower during operation of the reel mower to grip and hold the handle assembly to guide and operate the reel mower. In many cases, the reel mower is self propelled by an internal combustion engine carried on the frame of the reel mower. This engine also provides power to the rotatable reel of the reel mower.

The internal combustion engine provided on many reel mowers is often a single cylinder engine. Such an engine characteristically produces vibration in the frame of the reel mower as the engine operates. This vibration interferes with the precision cutting afforded by the reel mower. Some way of reducing or compensating for the vibrations induced by the engine, or such other vibrational excitation source as might be present, would be advantageous.

SUMMARY OF THE INVENTION

One aspect of this invention relates to a reel mower having a frame supported for movement over the ground. A reel cutting unit is carried on the frame. A mass damper is attached to the frame by at least one elastomeric coupler such that the mass damper is able to move relative to the frame by deflection of the elastomeric coupler. The mass damper has a weight and the elastomeric coupler has a stiffness with the weight of the mass damper and the stiffness of the elastomeric coupler being chosen to damp or lessen vibration produced by a vibrational excitation source.

Another aspect of this invention relates to a reel mower which comprises a frame supported for movement over the ground. A reel cutting unit is carried on the frame. An internal combustion engine is carried on the frame for providing power. A mass damper is attached to the frame by at least one elastomeric coupler. The mass damper is free to move relative to the frame only through shear of the coupler to damp vibration induced in the frame by the engine.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
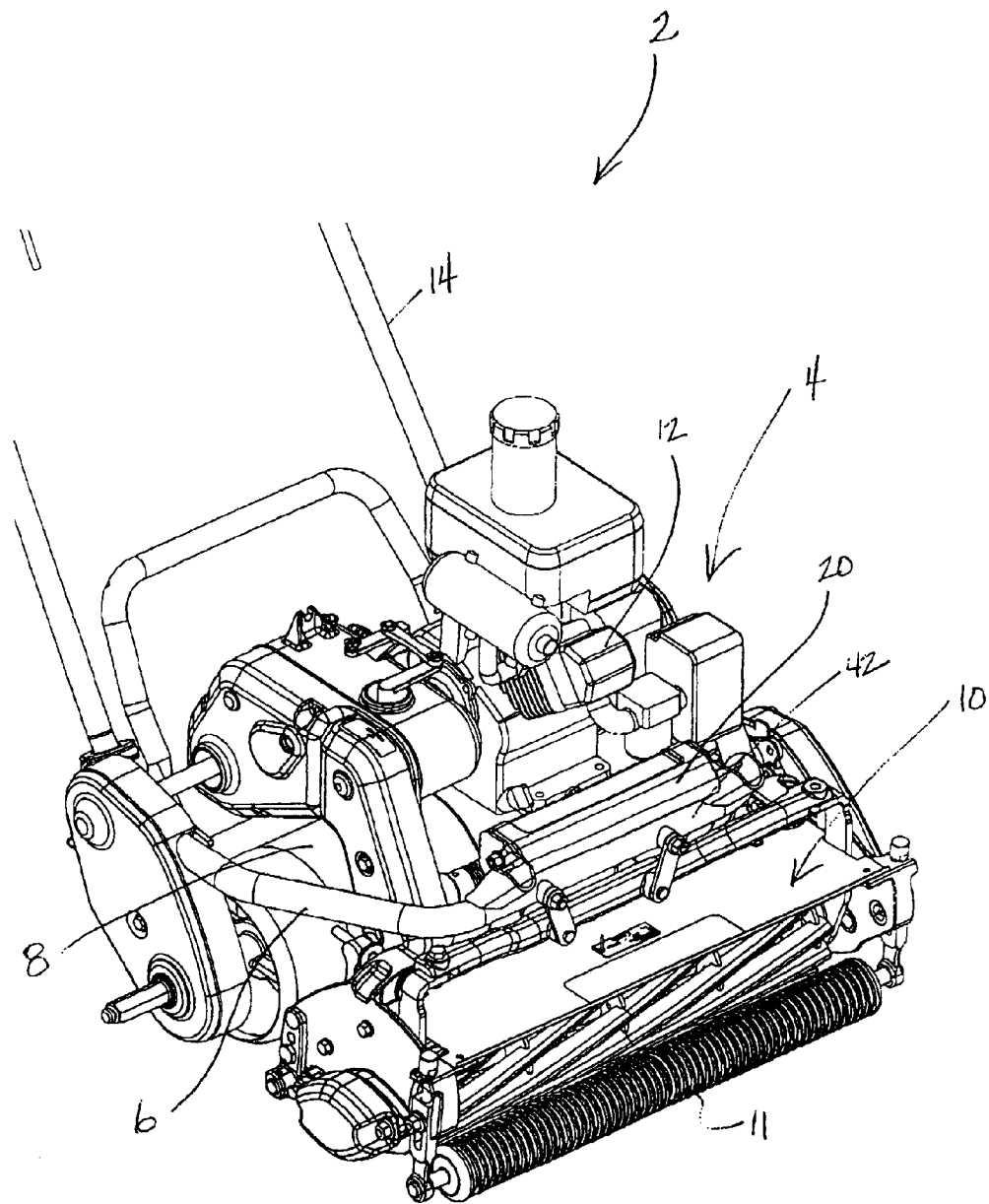
FIG. 1 is a perspective view of one type of reel mower, namely of a walk greensmower, having a mass damper for reducing vibration induced in the frame of the reel mower by the internal combustion engine carried on the frame.
Figure 2:
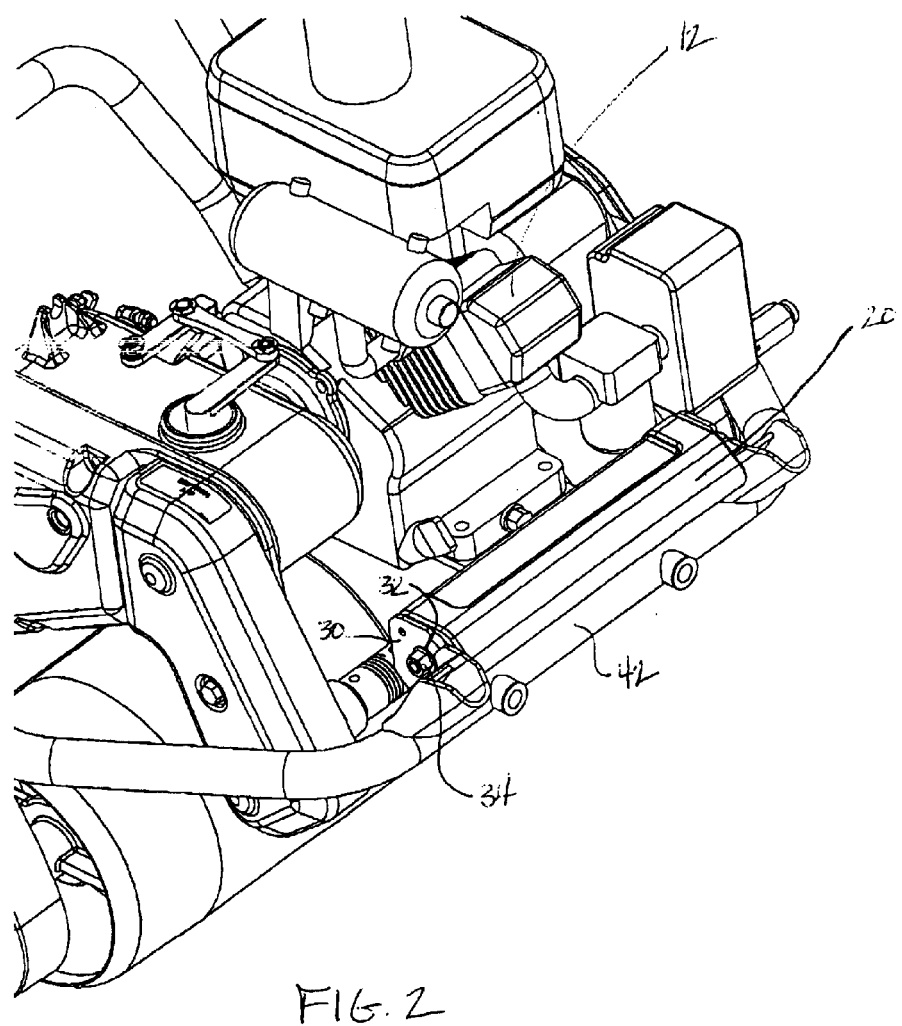
FIG. 2 is an enlarged perspective view of a portion of the reel mower of FIG. 1, more particularly illustrating the mass damper.

A reel mower is illustrated generally as 2 in FIG. 1. Reel mower 2 as shown in FIG. 1 comprises a walk greensmower 4. However, the depiction of a walk greensmower 4 herein is for illustrative purposes and is not meant to be a representation of the only type of reel mower 2 with which this invention could be used. Reel mower 2 could also comprise a reel mower having a plurality of reel type cutting units attached to the frame of a riding vehicle, such as a reel mower known as a triplex mower. Thus, reel mower 2 could have just one reel type cutting unit 10 or a plurality of such cutting units 10.

Walk greensmower 4 includes a frame 6 that is supported for movement over the ground during operation of walk greensmower 4 by a rear traction drum 8. A reel type cutting unit 10 is carried on the front of frame 6 for mowing grass. Cutting unit 10 is preferably carried on frame 6 in such a manner that cutting unit 10 is able to float or pivot relative to frame 6 about one or multiple axes to allow cutting unit 10 to better follow the contours of the ground. Cutting unit 10 is supported for rolling over the ground by its own front and rear rollers 11, with only the front roller 11 being illustrated in FIG. 1.

Additional details regarding cutting unit 10 and how it is connected to frame 6 may be found in International Publication WO 02/00007, dated Jan. 3, 2002, which is hereby incorporated by reference.

A single cylinder internal combustion engine 12 is provided on frame 6 for powering both cutting unit 10 and traction drum 8. A handle assembly 14 extends upwardly and rearwardly from frame 6 to allow an operator to grip and hold handle assembly 14 to thereby guide frame 6 during operation of reel mower 2.

Figure 3:
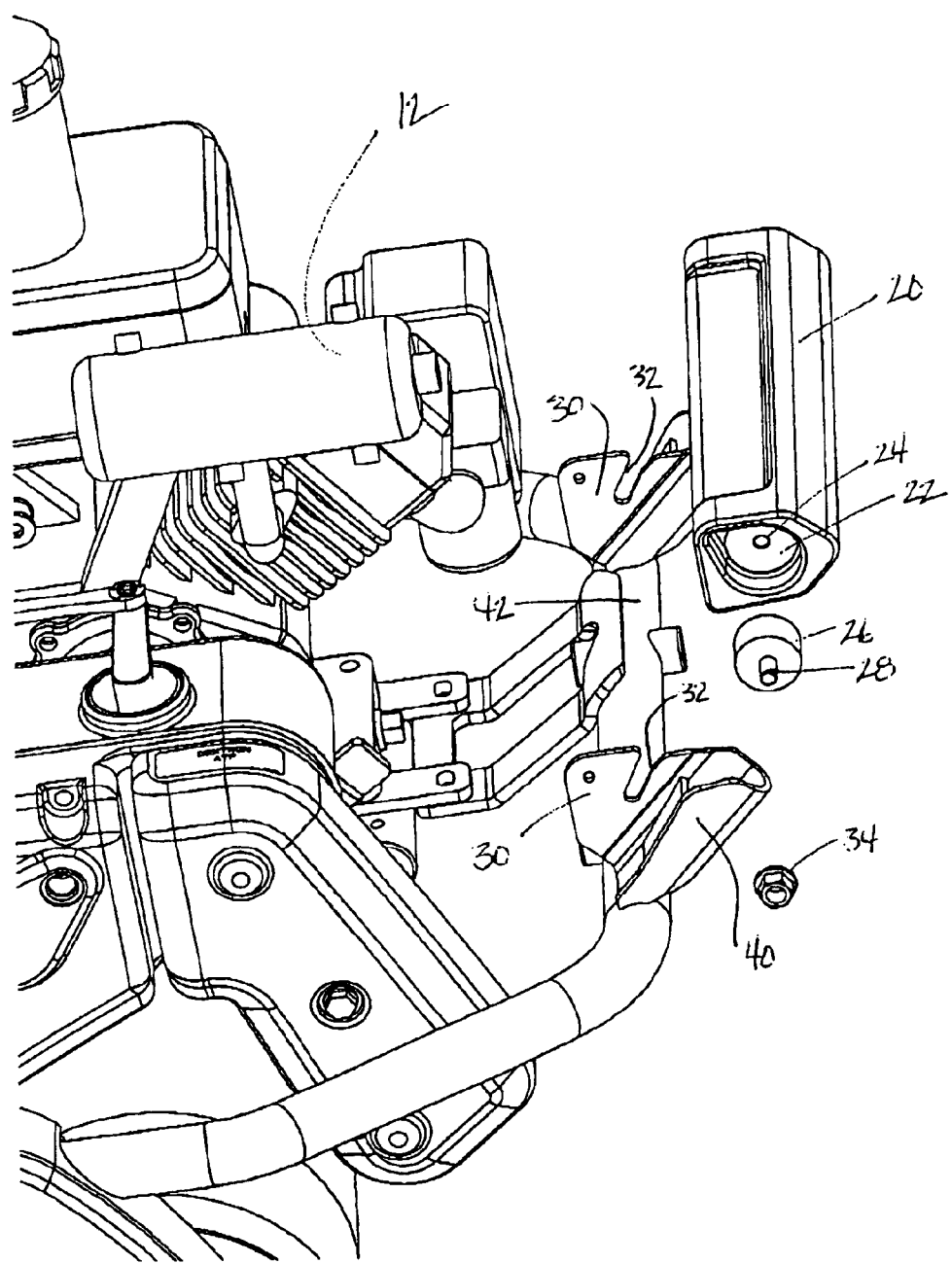
FIG. 3 is an enlarged perspective view of a portion of the reel mower of FIG. 1, more particularly illustrating in exploded form the mass damper and one of the elastomeric couplers that couple the mass damper to the frame of the reel mower.

This invention relates to a mass damper 20 that is attached to frame 6 of walk greensmower 4. Mass damper 20 is in the form of an elongated bar, but the shape of mass damper 20 can vary and is not important to this invention. Each end of mass damper 20 has a recess or cavity 22 provided therein, one cavity 22 at one end of mass damper 20 being shown in FIGS. 3 and 4. Each cavity 22 includes a threaded circular bore 24 extending into the interior of mass damper 20.

Figure 4:
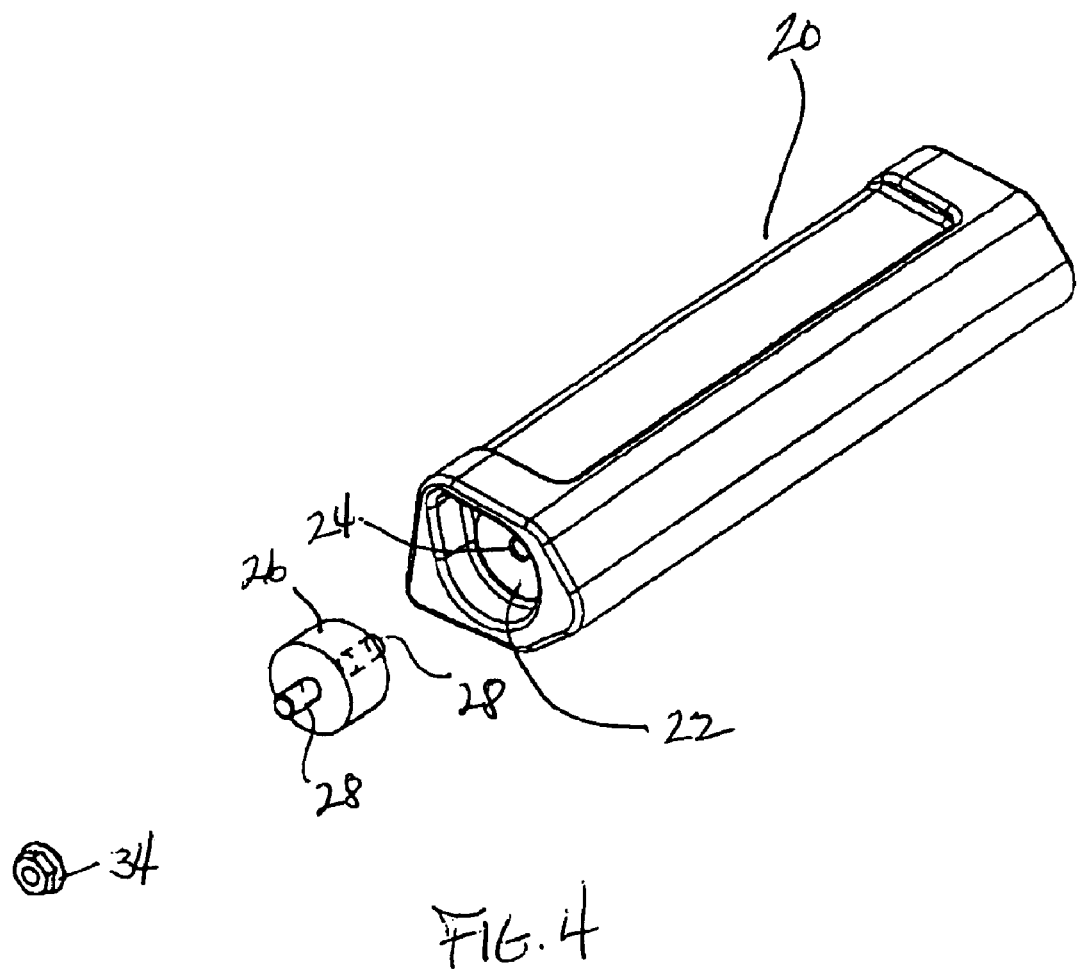
FIG. 4 is an enlarged perspective view in exploded form of the mass damper and one of the elastomeric couplers that couple the mass damper to the frame of the reel mower.

Each end of mass damper 20 is coupled to frame 6 of walk greensmower 4 by a cylindrical elastomeric coupler 26, such as a coupler made of rubber. Opposite faces of coupler 26 are provided with stub shafts 28 that extend outwardly from the opposite faces of coupler 26. Thus, one stub shaft 28 extends to the left of coupler 26 and the other stub shaft 28 extends to the right of coupler 26 as shown in FIG. 4. The ends of stub shafts 28 are threaded.

One coupler 26 is attached to each end of mass damper 20 by taking coupler 26 and placing coupler 26 into the cavity 22 on one end of mass damper 20 and by rotating coupler 26 to thread stub shaft 28 on one face of coupler 26 into threaded bore 24 in cavity 22. Cavity 22 is sized to substantially enclose coupler 26 after installation. Thus, when both couplers 26 have been installed, couplers 26 will be substantially enclosed in cavities 22 on each end of mass damper 20 with the exception that the other stub shaft 28 on each coupler, i.e. the stub shaft 28 on the opposite face of coupler 26, will stick out from each side of mass damper 20 much like the handles on a rolling pin.

Two mounting brackets 30 are provided on frame 6 of walk greensmower 4. Mounting brackets 30 are spaced apart by a distance that is sufficient to allow mass damper 20 to be placed between them. Each mounting bracket 30 includes an upwardly extending slot 32. Each outwardly protruding stub shaft 28 on each end of mass damper 20, namely each stub shaft 28 that sticks out from each end of mass damper 20 after couplers 26 are installed in cavities 22 on each end of mass damper 20, is simply dropped down into slot 32 on bracket 30. A nut 34 is then threaded onto the threaded end of stub shaft 28 to clamp stub shaft 28 against the side of bracket 30.

When so assembled, each coupler 26 has one stub shaft 28 clamped to a bracket 30 on frame 6 and the other stub shaft 28 is screwed into one end of mass damper 20. The elastomeric material forming coupler 26 is interposed between these two stub shafts and unites stub shafts 28 together but with stub shafts 28 not being directly connected to one another. Motion between the two stub shafts 28 is permitted, but only by twisting or shearing the elastomeric material forming coupler 26 between the two stub shafts 28.

Brackets 30 used to attach mass damper 20 to frame 6 of walk greensmower 4 can be formed as extended flange portions of saddles 40 that mount a grass collecting basket (not shown) to frame 6 of walk greensmower 4. However, brackets 30 need not be formed as part of something else, but could simply be separate brackets 30 attached to some portion of frame 6 of walk greensmower 4, i.e. to the cross tube 42 shown in FIG. 3. Thus, brackets 30 could be entirely separate from the grass basket saddles 40 if so desired.

During operation of reel mower 2, operation of engine 12 will induce a rhythmic vibration in frame 6 of walk greensmower 4 which is of greatest amplitude in a particular frequency range. In the case of walk greensmower 4 shown herein, the frequency range of concern is 14–20 hz. This vibration is transmitted to mass damper 20 through couplers 26 by a shearing action in couplers 26, i.e. by twisting couplers 26 between their stub shafts 28 as described above rather than by compression of couplers 26. This force transmission to mass damper 20 will induce a counter movement in mass damper 20 that is sufficient to substantially damp engine vibration in the frequency range of concern, i.e. in the 14–20 hz range for walk greensmower 4 shown in FIG. 1.

This results in much less vibration being transmitted to reel cutting unit 10. Thus, reel cutting unit 10 can cut more precisely and consistently even at low heights of cut since cutting unit 10 is not being vibrated or jiggled as much as it would have been without mass damper 20.

The weight of mass damper 20 has to be selected in conjunction with the stiffness of couplers 26 to damp vibration in the desired frequency range according to the following formula:

$$F = \sqrt{\frac{K}{M}}$$

where F=Frequency, K=Spring Constant of the Elastomeric Coupler, and M=Mass of the Mass Damper. For a walk greensmower 4 of the type shown herein powered by a 3.5 hp single cylinder internal combustion engine 12, a mass damper weighing 11 pounds coupled to frame 6 by rubber couplers sold by Barry Controls of Brighton, Mass., Model A32151 isolators, will effectively damp engine vibrations in the 14 to 20 hz range.

Various modifications of this invention will be apparent to those skilled in the art. For example, while engine 12 is one vibrational excitation source shown herein, this invention would be useful for damping vibrations arising from some other vibrational excitation source. Considering a triplex reel mower, such a reel mower has a plurality of reel cutting units each carried on the end of a lift arm that joins the reel cutting unit to a riding vehicle. In such a reel mower, the reel cutting units sometimes exhibit a rhythmic bouncing that is undesirable. A properly sized mass damper placed on the end of each lift arm supporting each reel cutting unit, or at such other location as may be appropriate, should help reduce such bouncing by damping the vibrations caused by the vibrational excitation source, which in this case would obviously not be an internal combustion engine.

In addition, while movement of mass damper 20 is permitted by a shearing action of couplers 26, this invention is not limited to the use of a shearing action in couplers 26. Mass damper 20 could be coupled to frame 6 by at least one elastomeric coupler 26 that is deflected by compressing coupler 26 or through a combination of compression and shearing.

Accordingly, the invention is to be limited only by the appended claims.

We claim:

1. A reel mower, which comprises:
   (a) a frame supported for movement over the ground;
   (b) at least one reel cutting unit carried on the frame;
   (c) a mass damper attached to the mower by at least one elastomeric coupler, wherein the mass damper comprises an autonomous body that is separate from the frame and from the at least one reel cutting unit such that the mass damper is able to move independently relative to motion of the grams and relative to motion of the at least one cutting unit by deflection of the elastomeric coupler, and wherein the mass damper has a weight and the elastomeric coupler has a stiffness with the weight of the mass damper and the stiffness of the elastomeric coupler being chosen such that vibration produced by a vibrational excitation source induces counter motion in the mass damper which is distinct from motion of the frame and from motion of the at least one cutting unit to damp or lessen the vibration produced by the vibrational excitation source; and
   (d) wherein the mass damper is elongated having two opposite ends, and further including first and second elastomeric couplers for coupling the ends of the mass damper to the mower with the first elastomeric coupler coupling one end of the mass damper to the mower and the second elastomeric coupler coupling the opposite end of the mass damper to the mower.

2. The reel mower of claim 1, further including a handle assembly that extends upwardly and rearwardly from the frame to allow an operator to grip and hold the handle assembly during operation of the reel mower.

3. The reel mower of claim 1, wherein the vibrational excitation source comprises an internal combustion engine carried on the frame for providing power.

4. The reel mower of claim 3, wherein the internal combustion engine is a single cylinder engine.

5. The reel mower of claim 1, wherein each end of the mass damper includes a cavity, and wherein the cavity and couplers are sized such that each coupler is substantially enclosed within a cavity at one end of the mass damper.

6. The reel mower of claim 1, wherein the mass damper is carried on the frame, wherein each coupler has opposed faces, and wherein one face of each coupler is secured to the mass damper and the other face of each coupler is secured to the frame.

7. The reel mower of claim 1, wherein only one reel cutting unit is carried on the frame.

8. A reel mower, which comprises:
   (a) a frame supported for movement over the ground;
   (b) at least one reel cutting unit carried on the frame;
   (c) an internal combustion engine carried on the frame for providing power; and
   (d) a mass damper attached to the mower by at least one elastomeric coupler, wherein the mass damper is free to move relative to the mower to thereby damp vibration, and wherein the coupler includes two outwardly protruding stub shafts attached respectively to the mass damper and to the mower.

9. The reel mower of claim 8, wherein one stub shaft is threaded into a bore on one of the mass damper and the mower and the other stub shaft is clamped to the other of the mass damper and the mower.

10. The reel mower of claim 8, wherein the mass damper is free to move relative to the mower only through shear of the coupler.

11. A reel mower, which comprises:
    (a) a frame supported for movement over the ground;
    (b) at least one reel cutting unit carried on the frame; and
    (c) a mass damper attached to the mower by at least one elastomeric coupler having opposed faces with each face of the coupler including an outwardly protruding stub shaft, wherein one face of the coupler is secured to the mass damper by one of the stub shafts and the other face of the coupler is secured to the mower by the other of the stub shafts, wherein the mass damper is able to move relative to the mower by deflection of the elastomeric coupler relative to the stub shafts, and wherein the mass damper has a weight and the elastomeric coupler has a stiffness with the weight of the mass damper and the stiffness of the elastomeric coupler being chosen to damp or lessen vibration produced by a vibrational excitation source.

12. The reel mower of claim 11, wherein the mass damper is carried on the frame of the mower.

13. A reel mower, which comprises:
    (a) a frame supported for movement over the ground;
    (b) a handle assembly that extends upwardly and rearwardly from the frame to allow an operator to grip and hold the handle assembly and to walk behind the handle assembly during operation of the reel mower;
    (c) a single cylinder internal combustion engine carried on the frame for providing power;
    (d) a single reel cutting unit carried on the frame; and
    (e) a mass damper attached to the frame by at least one elastomeric coupler, wherein the mass damper comprises an autonomous body that is separate from the frame and from the reel cutting unit such that mass damper is able to move independently relative to motion of the frame and relative to motion of the reel cutting unit, and wherein the mass damper has a weight and the elastomeric coupler has a stiffness with the weight of the mass damper and the stiffness of the elastomeric coupler being chosen to damp or lessen vibration that is forced in the frame of the reel mower by operation of the single cylinder internal combustion engine.

14. The reel mower of claim 13, wherein the mass damper overlies the reel cutting unit, wherein the reel cutting unit is mounted on a front of the frame of the reel mower.

15. The reel mower of claim 13, wherein the frame of the reel mower includes a front cross tube on which the reel cutting unit is carried, and wherein the mass damper is attached to the cross tube.

16. The reel mower of claim 13, wherein the mass damper is carried sub-stantially adjacent a front of the frame of the reel mower with the single cylinder engine being located between the mass damper and the handle assembly.

17. The reel mower of claim 13, wherein the mass damper is centered on a fore-and-aft extending longitudinal centerline of the frame of the reel mower.

* * * * *

UNITED STATES PATENT AND TRADEMARK OFFICE
CERTIFICATE OF CORRECTION

PATENT NO.    : 7,007,448 B2
DATED         : March 7, 2006
INVENTOR(S)   : Gerald E. Goman et al.

It is certified that error appears in the above-identified patent and that said Letters Patent is hereby corrected as shown below:

Column 4,
Line 36, change "grams" to -- frame --;

Column 6,
Line 17, change "such that mass" to -- such that the mass --;
Line 35, change "sub-stantially" to -- substantially --.

Signed and Sealed this

Thirtieth Day of May, 2006

JON W. DUDAS
*Director of the United States Patent and Trademark Office*